(12) United States Patent
Chang et al.

(10) Patent No.: US 8,116,101 B2
(45) Date of Patent: Feb. 14, 2012

(54) ELECTRONIC DEVICE

(75) Inventors: Yi-Ming Chang, Taipei (TW);
Yung-Chih Kuo, Taipei (TW);
Chung-Teng Wu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 233 days.

(21) Appl. No.: 12/368,963

(22) Filed: Feb. 10, 2009

(65) Prior Publication Data

US 2010/0142166 A1 Jun. 10, 2010

(30) Foreign Application Priority Data

Dec. 9, 2008 (TW) ................. 97147878 A

(51) Int. Cl.
*H05K 7/02* (2006.01)

(52) U.S. Cl. ........ 361/810; 361/719; 361/748; 361/752; 361/759; 361/818; 174/371; 174/377

(58) Field of Classification Search .................. 361/810, 361/719, 748, 752, 759, 818; 174/371, 377
See application file for complete search history.

(56) References Cited

U.S. PATENT DOCUMENTS

| | | | | |
|---|---|---|---|---|
| 3,980,053 A | * | 9/1976 | Horvath | 123/3 |
| 4,067,531 A | * | 1/1978 | Sikula | 220/378 |
| 4,198,613 A | * | 4/1980 | Whitley | 333/181 |
| 4,491,051 A | * | 1/1985 | Barcus | 84/731 |
| 4,603,316 A | * | 7/1986 | Kobayashi et al. | 340/602 |
| 4,618,197 A | * | 10/1986 | White | 439/76.1 |
| 4,661,888 A | * | 4/1987 | Jewell et al. | 361/818 |
| 4,674,807 A | * | 6/1987 | Boteler et al. | 439/106 |
| 4,867,706 A | * | 9/1989 | Tang | 439/620.07 |
| 4,972,303 A | * | 11/1990 | Machida et al. | 362/520 |
| 5,380,211 A | * | 1/1995 | Kawaguchi et al. | 439/74 |
| 5,391,091 A | * | 2/1995 | Nations | 439/378 |
| 5,665,610 A | * | 9/1997 | Nakata et al. | 438/18 |
| 6,115,259 A | * | 9/2000 | Karner | 361/759 |
| 6,268,408 B1 | * | 7/2001 | Dispenza | 523/222 |
| 6,347,044 B1 | | 2/2002 | Won et al. | |
| 6,393,672 B1 | * | 5/2002 | Anscher | 24/265 R |
| 6,400,049 B1 | * | 6/2002 | Lai | 310/67 R |
| 6,491,333 B2 | * | 12/2002 | Ichikawa et al. | 296/97.9 |
| 6,756,797 B2 | * | 6/2004 | Brandorff et al. | 324/754 |
| 6,856,209 B2 | * | 2/2005 | Tsang et al. | 333/12 |
| 7,085,146 B2 | * | 8/2006 | Pitzele | 363/147 |
| 7,227,761 B2 | * | 6/2007 | Estes et al. | 361/810 |
| 7,332,925 B2 | * | 2/2008 | Hsu | 324/765 |
| 7,352,873 B2 | * | 4/2008 | Shigeno et al. | 381/113 |
| 7,359,212 B2 | * | 4/2008 | Mayuzumi et al. | 361/760 |
| 7,506,436 B2 | * | 3/2009 | Bachman | 29/840 |
| 7,507,924 B2 | * | 3/2009 | Lorenzo Riera et al. | 200/314 |
| 7,517,231 B2 | * | 4/2009 | Hiew et al. | 439/76.1 |
| 7,542,106 B2 | * | 6/2009 | Morishita et al. | 349/58 |
| 7,553,178 B1 | * | 6/2009 | Wertz et al. | 439/331 |
| 2007/0183864 A1 | * | 8/2007 | Shishikura | 411/323 |
| 2009/0104796 A1 | * | 4/2009 | Yeh | 439/73 |

FOREIGN PATENT DOCUMENTS

TW M292884 6/2006

* cited by examiner

*Primary Examiner* — Xiaoliang Chen
(74) *Attorney, Agent, or Firm* — Jianq Chyun IP Office

(57) ABSTRACT

An electronic device including a housing, a circuit board, a first non-metal conductive cushion and a fastening element is provided. The circuit board is disposed in the housing. The first non-metal conductive cushion is disposed between the circuit board and the housing. A potential of the first non-metal conductive cushion is equal to a potential of the housing. The fastening element fastens the circuit board and the non-metal conductive cushion to the housing.

12 Claims, 9 Drawing Sheets

ELECTRONIC DEVICE

CROSS-REFERENCE TO RELATED APPLICATION

This application claims the priority benefit of Taiwan application serial no. 97147878, filed on Dec. 9, 2008. The entirety of the above-mentioned patent application is hereby incorporated by reference herein and made a part of specification.

BACKGROUND OF THE INVENTION

1. Field of the Invention

The present invention relates generally to a device, and more particularly, to an electronic device.

2. Description of Related Art

The main difference between portable computers and traditional desk-top computers is that portable computers are lightweight, thin, short and small, which makes portable computers easy to carry, and thus the convenience of using computers in various environments is provided. However, the portable electronic devices are prong to be subject to shock when moved, and the shock may cause damage to the interior circuit board indirectly.

FIG. 1 is a perspective view of a conventional portable electronic device. FIG. 2 is a cross-sectional view of the conventional portable electronic device. Referring to FIGS. 1 and 2, the portable electronic device 10 (e.g., a notebook computer) includes a display 20, a host 30 and a hinge structure 40 interconnecting the display 20 and the host 30. The host 30 consists of an upper cover 32, a lower cover 34 and a circuit board 36 disposed between the upper cover 32 and the lower cover 34. The lower cover 34 includes a plurality of studs 34a having an internal thread. The circuit board 36 has a mounting hole 36a aligned with the stud 34a. When the circuit board 36 is assembled to the lower cover 34, a screw 50 passes through the mounting hole 36a of the circuit board 36 and is threaded into a corresponding one of the studs 34a of the lower cover 34, thereby stably assembling the circuit board 36 with the lower cover 34.

While the circuit board 36 can be secured in the manner of the assembly as described above, when the portable electronic device 10 is subject to shock or impact, stresses are concentrated at a fastening area of the circuit board 36 where the screw 50 is threaded because that the screw 50, the circuit board 36 and the lower cover 34 are all made of rigid materials. The concentrated stress may easily crack or even crash the circuit board 36 as well as cause the circuit board 36 to be deformed, thus affecting electrical signal transmission of the circuit board 36.

SUMMARY OF THE INVENTION

Accordingly, the present invention is directed to an electronic device which can increase the buffering capability of the circuit board against external shock.

The present invention provides an electronic device including a housing, a circuit board, a first non-metal conductive cushion, and a fastening element. The circuit board is disposed in the housing. The first non-metal conductive cushion is disposed between the circuit board and the housing, with a potential of the first non-metal conductive cushion being equal to a potential of the housing. The fastening element fastens the circuit board and the first non-metal conductive cushion to the housing.

According to one embodiment of the present invention, the first non-metal conductive cushion is a washer.

According to one embodiment of the present invention, the first non-metal conductive cushion includes a sleeve portion and a first supporting portion substantially perpendicularly connected to the sleeve portion. The circuit has a mounting hole. The sleeve portion is disposed in the mounting hole, and the first supporting portion is disposed between a first surface of the circuit board and the housing. In addition, the first non-metal conductive cushion further includes a second supporting portion substantially perpendicularly connected to the sleeve portion and disposed between a second surface of the circuit board opposite to the first surface and the housing.

According to one embodiment of the present invention, the electronic device further includes a second non-metal conductive cushion, wherein the second non-metal conductive cushion and the first non-metal conductive cushion are located at opposite sides of the circuit board, respectively.

According to one embodiment of the present invention, the housing includes a first housing portion and a second housing portion. The circuit board is disposed between the first housing portion and the second housing portion. The fastening element passes through the circuit board and the first non-metal conductive cushion and is fastened to at least one of the first housing portion and the second housing portion. The first housing portion includes a first mounting portion and the second housing portion includes a second mounting portion.

According to one embodiment of the present invention, the first mounting portion is a hollow post. The second mounting portion defines an opening. The fastening element passes through the first mounting portion and the second mounting portion to fasten the first housing portion and the second housing portion together.

According to one embodiment of the present invention, the first housing portion further includes a body and a protruding portion, the protruding portion protrudes from a surface of the body that faces toward the circuit board, and the protruding portion is connected between the body and the first mounting portion.

According to one embodiment of the present invention, the first mounting portion or the second mounting portion includes an internal thread, and the fastening element is a screw.

According to one embodiment of the present invention, the fastening element includes a screw and a nut, the nut fits in the second mounting portion of the second housing portion, and the screw passes through the first mounting portion and is threaded into the nut.

According to one embodiment of the present invention, the first non-metal conductive cushion further comprises a plurality of protrusions in contact with at least one of the housing and the circuit board.

According to one embodiment of the present invention, the material of the first non-metal conductive cushion is conductive rubber.

In the electronic device of the present invention, the non-metal conductive cushion provides buffering against external impact and shock to the circuit board to thereby protect the circuit board. In addition, the circuit board can be conductive to the housing via the non-metal conductive cushion so that the circuit board and the housing have a same potential. Therefore, the provision of the non-metal conductive cushion can buffer against external shock as well as achieve an equivalent grounding result by having the same potential. An extra grounding circuit or cushion element is not required by the electronic device, thereby reducing the cost.

In order to make the aforementioned and other features and advantages of the present invention more comprehensible, embodiments accompanied with figures are described in detail below.

DESCRIPTION OF THE EMBODIMENTS

First Embodiment

Figure 1:
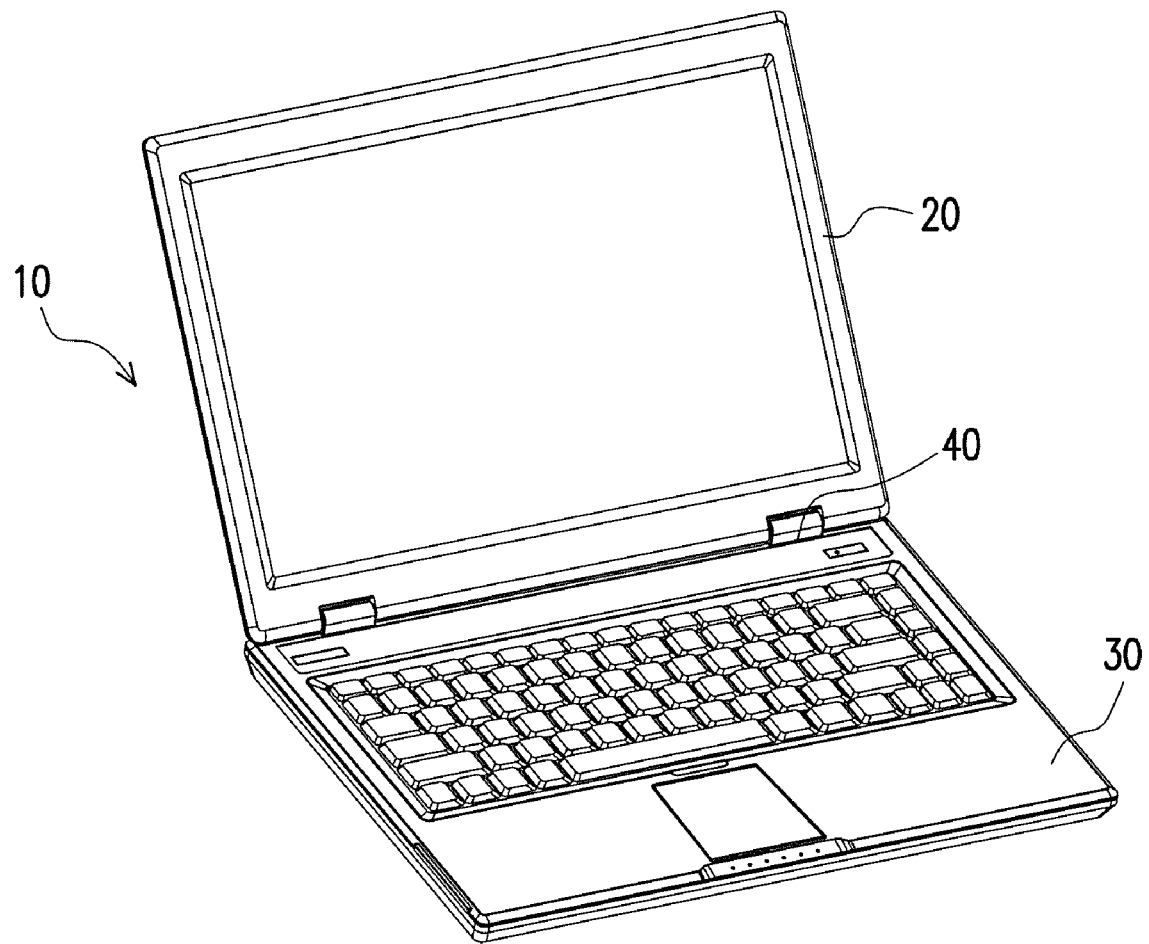
FIG. 1 is a perspective view of a conventional portable electronic device.
Figure 2:
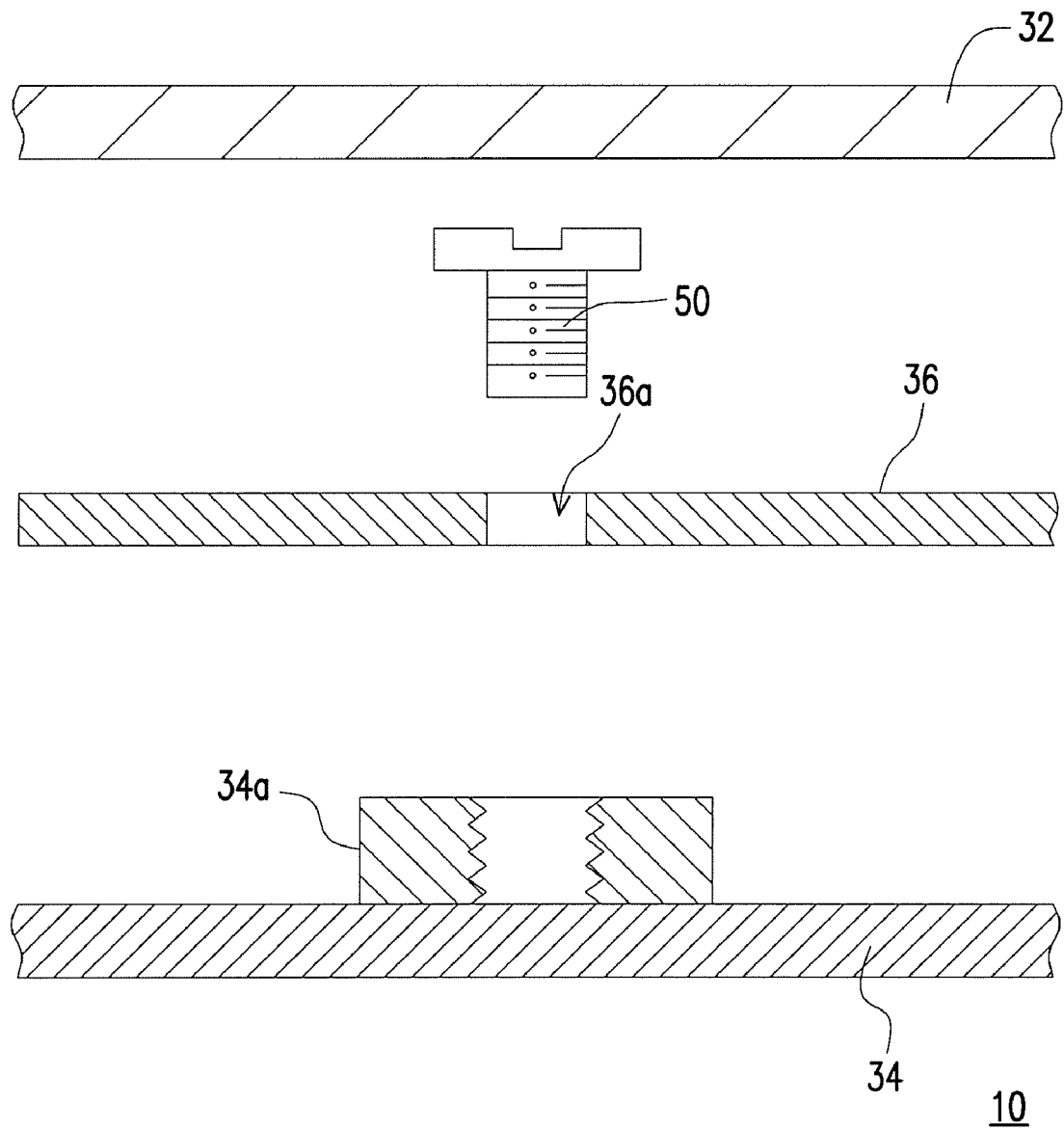
FIG. 2 is a cross-sectional view of the conventional portable electronic device.
Figure 3:
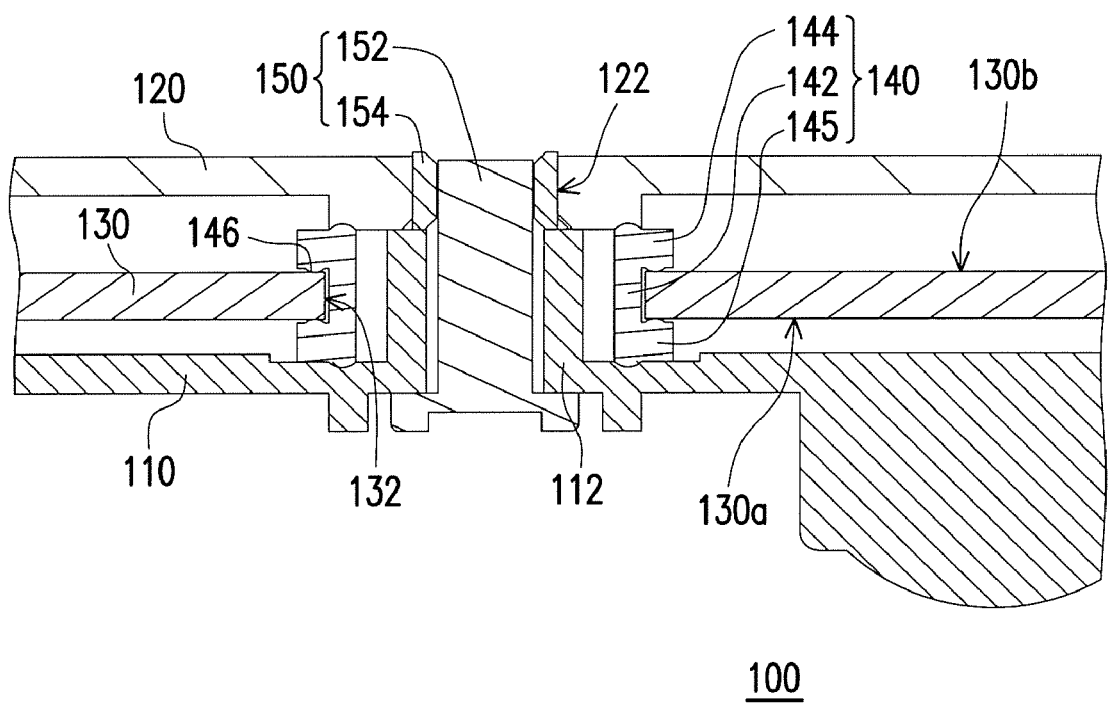
FIG. 3 illustrates a cross-sectional view of an electronic device according to one embodiment of the present invention.

FIG. 3 illustrates a cross-sectional view of an electronic device according to a first embodiment of the present invention. As shown in FIG. 3, the electronic device 100 of the present embodiment includes a housing, a circuit board 130, a non-metal conductive cushion 140, and a fastening element 150. The housing includes a first housing portion 110 and a second housing portion 120. The first housing portion 110 includes a first mounting portion 112 which, in the present embodiment, is a hollow post. The second housing portion 120 includes a second mounting portion 122 which is, for example, an opening. In the present embodiment, the material of the first housing portion 110 and the second housing portion 120 may be metal or other electrically conductive materials. The circuit board 130 has a mounting hole 132 and is disposed between the first housing portion 110 and the second housing portion 120. The non-metal conductive cushion 140 is attached to the circuit board 130 at the mounting hole 132. The non-metal conductive cushion 140 is made from an electrically conductive material, and the composition of the electrically conductive material can be entirely non-metal or, may contain a small amount of conductive particles like metal particles, an example of such material being conductive rubber. The non-metal conductive cushion 140 of the present embodiment includes a sleeve portion 142 and two supporting portions 144, 145. The sleeve portion 142 is disposed in the mounting hole 132 of the circuit board 130. Both the supporting portions 144, 145 are substantially perpendicularly connected with the sleeve portion 142. The supporting portion 144 is disposed between the second housing portion 120 and a second surface 130b of the circuit board 130. The supporting portion 145 is disposed between the first housing portion 110 and a first surface 130a of the circuit board 130. The supporting portions 144, 145 cooperatively support the circuit board 130 therebetween, and due to the conductive characteristic of the non-metal conductive cushion 140, a potential of the supporting portions 144, 145 is equal to a potential of the housing. Consequently, the supporting portions 144, 145 attain a result equivalent to the grounding of the first housing portion 110 and the second housing portion 120, respectively. In other embodiments, it is possible only one of the supporting portions 144, 145 achieves the equivalent grounding effect with the first housing portion 110 or the second housing portion 120 according to actual requirements. The terms used herein, such as equal potential and ground/equivalent grounding, are interchangeable, which have the same meaning and provide the same result. The fastening element 150 extends through the first mounting portion 112 and the sleeve portion 142 of the non-metal conductive cushion 140 and is fastened into the second mounting portion 122 to fasten the circuit board 130, the first housing portion 110 and the second housing portion 120 together. In the present embodiment, the fastening element 150 may include a screw 152 and a nut 154. The nut 154 is disposed in the second mounting portion 122 of the second housing portion 120, and the screw 152 extends through the first mounting portion 112 and is threaded into the nut 154.

In assembly of the electronic device 100 of the present embodiment, the non-metal conductive cushion 140 is first engaged into the mounting hole 132 of the circuit board 130 with the circuit board 130 being sandwiched between the supporting portions 144, 145 of the non-metal conductive cushion 140, and the nut 154 is fitted in the second mounting portion 122. The screw 152 then passes through the first mounting portion 112 and the sleeve portion 142 of the non-metal conductive cushion 140 and is threaded into the nut 154. As such, the circuit board 130 is positioned between the first housing portion 110 and the second housing portion 120 by means of the fastening element 150. In particular, the non-metal conductive cushion 140 of the present embodiment is conductive and in contact with all the first housing portion 110, the second housing portion 120 and the circuit board 130, so that the circuit board 130 can be grounded via the non-metal conductive cushion 140 with at least one of the first housing portion 110 and the second housing portion 120. In addition, the non-metal conductive cushion 140 also provides buffering to protect the circuit board 130, thereby avoiding collision of the circuit board 130 and the first housing portion 110 or the second housing portion 120 of the electronic device 100 due to external shock and positioning the circuit board 130 stably with respect to the first housing portion 110 or the second housing portion 120. In the present embodiment, the circuit board 130 is mounted to both the first housing portion 110 and the second housing portion 120. In alternative embodiments, the circuit board 130 may be mounted only to the first housing portion 110 or only to the second housing portion 120, which would be readily appreciated by those of ordinary skill in the art upon reading the description set forth herein and is therefore not described further herein with reference to additional drawings.

Figure 4:
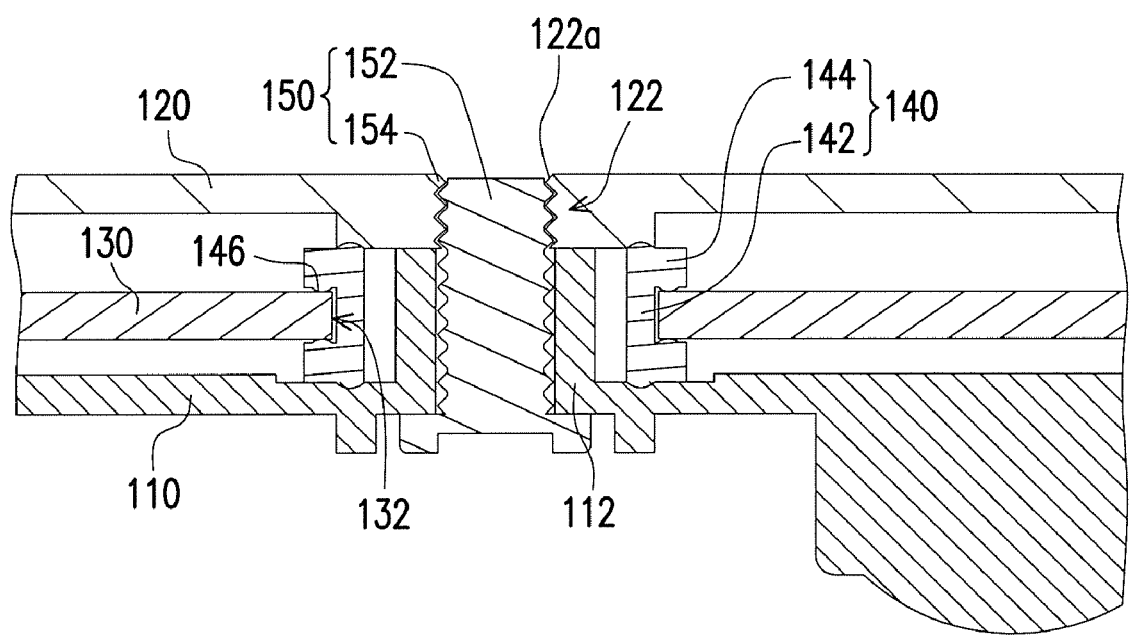
FIG. 4 illustrates a cross-sectional view of a housing of the electronic device according to another embodiment of the present invention.

FIG. 4 illustrates a cross-sectional view of a housing of the electronic device according to another embodiment of the present invention. As shown in FIG. 4, the second mounting portion 122 has, for example, an internal thread 122a and, the fastening element 150 is, for example, a screw. Therefore, the fastening element 150 can pass through the first mounting portion 112 and is directly threaded with the internal thread 122a of the second mounting portion 122 to fasten the circuit board 130, the first housing portion 110 and the second housing portion 120 together. In other embodiments (not shown), the internal thread 122a may be formed on the first mounting portion 112 based on actual requirements.

In addition, the non-metal conductive cushion 140 may include a plurality of protrusions 146 formed on the supporting portions 144, 145. The protrusions 146 are used to contact with at least one of the first housing portion 110, the second housing portion 120, and the circuit board 130 to increase the stability of sandwiching the circuit board 130 and hence achieve the grounding of the circuit board 130 via the housing. In FIG. 3, the protrusions 146 are formed on the non-metal conductive cushion 140 at contact areas where the non-metal conductive cushion 140 contacts with the first housing portion 110, with the second housing portion 120, and with the circuit board 130. When the circuit board 130, the first housing portion 110 and the second housing portion 120 are assembled together with the fastening element 150, the protrusions 146 are squeezed by the first housing portion 110, the second housing portion 120, and the circuit board 130 to achieve a more tight assembly. In addition, with the protrusions 146 being squeezed, the equivalent grounding result of the circuit board 130 to the first/second housing portions 110, 120 can be further increased.

Second Embodiment

Figure 5:
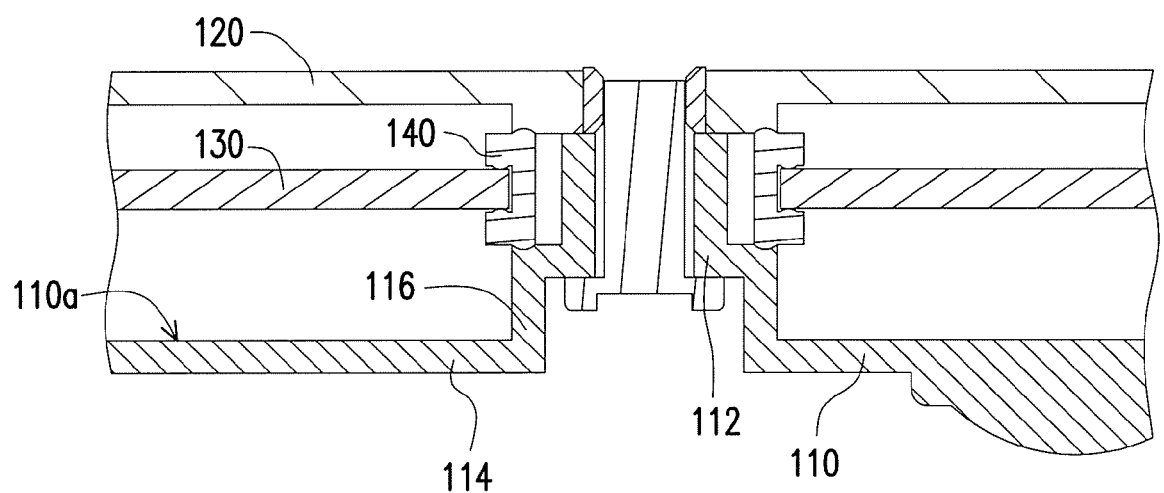
FIG. 5 illustrates a cross-sectional view of an electronic device according to a second embodiment of the present invention.

FIG. 5 illustrates a cross-sectional view of an electronic device according to a second embodiment of the present invention. This embodiment is similar to the first embodiment, in which like reference numerals refer to like elements throughout. As shown in FIG. 5, the first housing portion 110 of the present embodiment further includes a body 114, and a protruding portion 116 protrudes from a surface 110a of the body 114 that faces toward the circuit board 114. In addition, the protruding portion 116 is connected between the body 114 and the first mounting portion 112 which is a hollow post. The distance between the body 114 of the first housing portion 110 and the circuit board 130 in the present embodiment is larger than the distance between the first housing portion 110 and the circuit board 130 in the first embodiment. Because the height of the protruding portion 116 can be adjusted in accordance with the height of components on the circuit board 130, increasing the distance between the body 114 and the circuit board 130 by means of the protruding portion 116 can make the selection and configuration of the components on the circuit board 130 more flexible.

Third Embodiment

Figure 6:
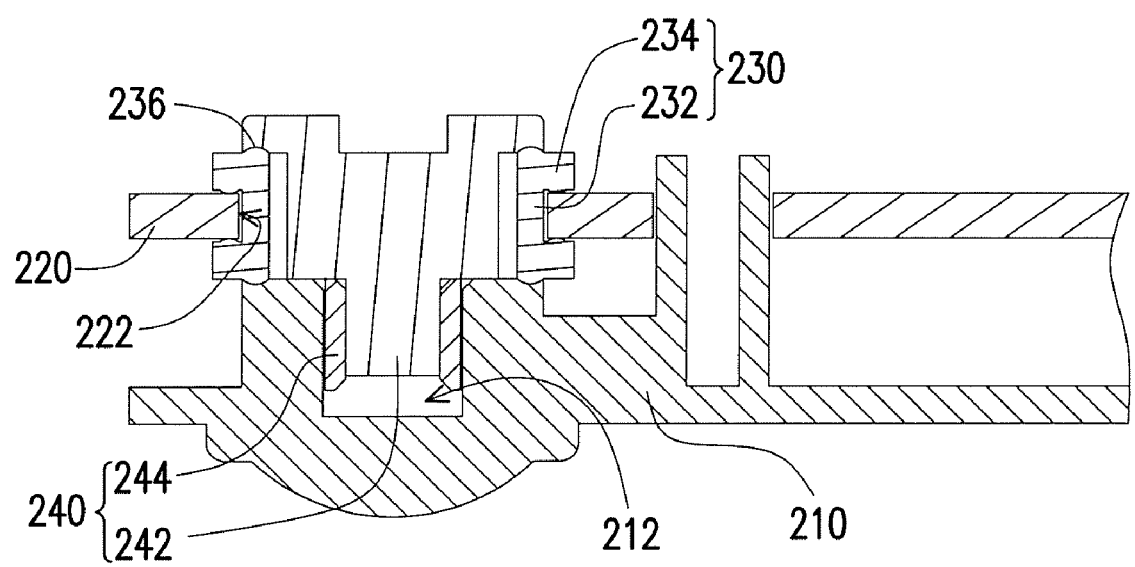
FIG. 6 is a cross-sectional view of an electronic device according to a third embodiment of the present invention.

FIG. 6 is a cross-sectional view of an electronic device according to a third embodiment of the present invention. As shown in FIG. 6, some elements of the electronic device 200 of the third embodiment are similar to those of the first embodiment and therefore are not repeated. The following description is made in respect to those important and different elements. The first housing portion 210 of the third embodiment includes a first mounting portion 212 which is a recess. In the present embodiment, the material of the first housing portion 210 is metal or other conductive materials. For the sake of clarity and ease of description, the second housing portion is not shown in FIG. 6, but it does not mean the electronic device 200 of the present embodiment does not include the second housing portion.

As shown in FIG. 6, the sleeve portion 232 of the non-metal conductive cushion 230 is engaged in the mounting hole 222 of the circuit board 220, with the supporting portions 234 located at opposite sides of the sleeve portion 232 and supporting the circuit board 220. One of the supporting portions 234 is electrically coupled to the first housing portion 210 for grounding. The nut 244 of the fastening element 240 is disposed in the first mounting portion 212, and the screw 242 of the fastening element 240 passes through the non-metal conductive cushion 230 and is threaded into the nut 244 to fasten the circuit board 220 to the first housing 210. The nut 244 disposed in the first mounting portion 212 may be replaced by an internal thread with which the screw 242 can be engaged.

In addition, the non-metal conductive cushion 230 may include a plurality of protrusions 236. The protrusions 236 are disposed at at least one of the contact areas between the supporting portions 234 and the circuit board 220 and between the fastening element 240 and the first housing 210. When the circuit board 220 and the first housing portion 210 are fastened together with the fastening element 240, the first housing portion 210, the fastening element 240, and the circuit board 220 squeezes the protrusions 236, thereby achieving a more tight assembly. Besides, the circuit board 220 can be grounded through the protrusions 236 electrically coupled to the first housing portion 210.

Figure 7:
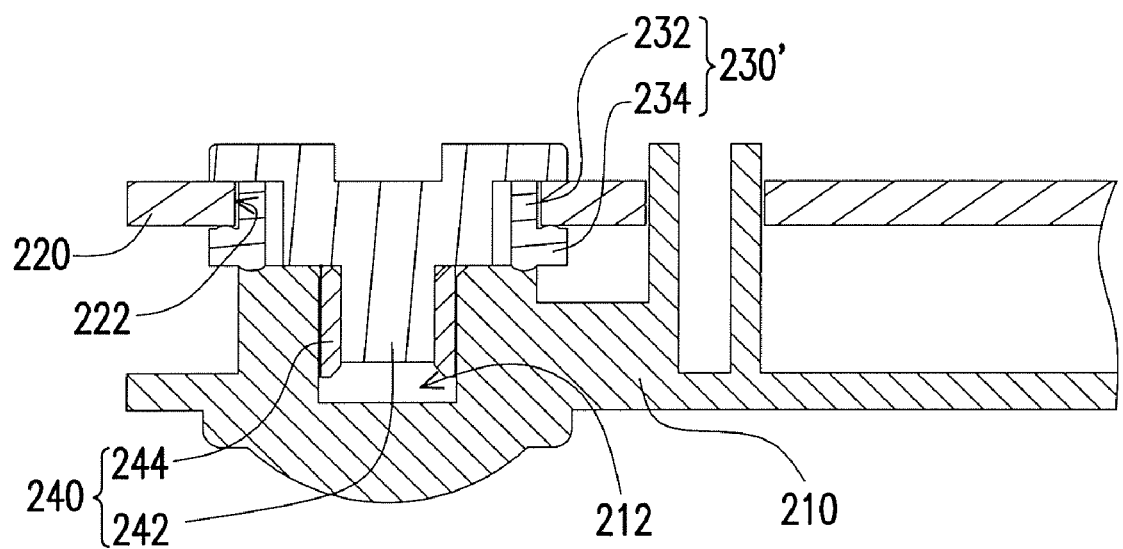
FIG. 7 illustrates an implementation of the non-metal conductive cushion including only one supporting portion.
Figure 8:
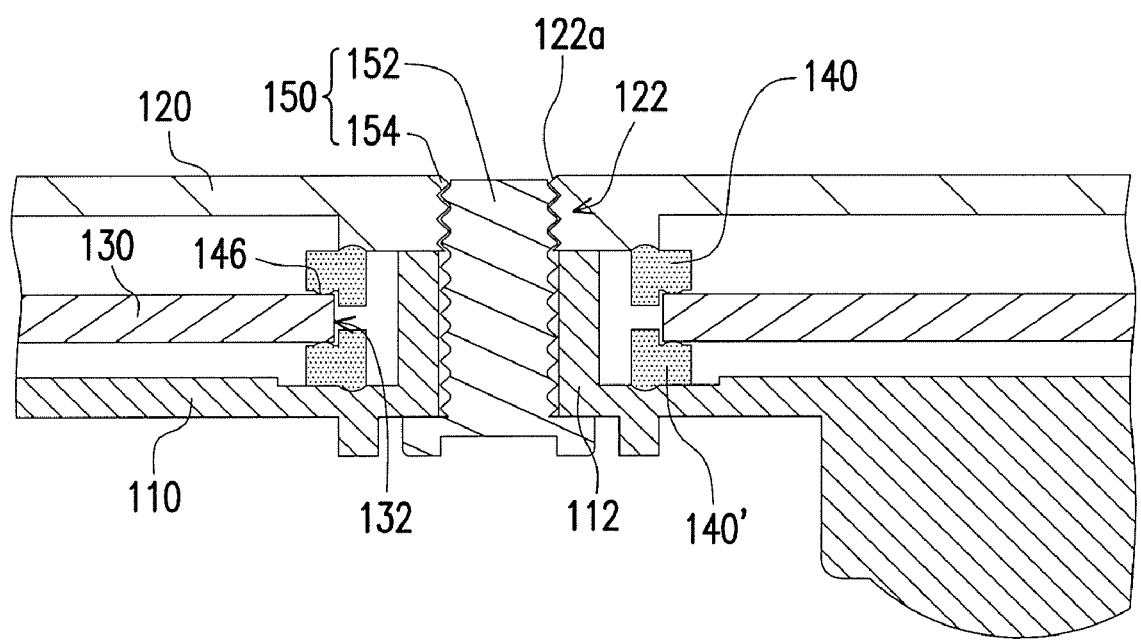
FIG. 8 illustrates an implementation in which multiple non-metal conductive cushions cooperatively sandwich a circuit board.

While the non-metal conductive cushion is illustrated as having two supporting portions in the above three embodiments, it is to be understood that the non-metal conductive cushion of the present invention may include only one supporting portion, and the supporting portion and the housing are made grounded due to the equal potential of the non-mental conductive cushion and the housing, achieved by the conductive characteristic of the non-metal conductive cushion. FIG. 7 illustrates an implementation of the non-metal conductive cushion including only one supporting portion. Referring to FIG. 7, as long as the non-metal conductive cushion 230' has a supporting portion 234, the non-metal conductive cushion 230' can electrically couple the circuit board 220 to a housing 210 for grounding and also provides buffering for the circuit board 220. Alternatively, two non-metal conductive cushions 140, 140' each having a supporting portion can be used together to support the circuit board 130 as illustrated in FIG. 8.

Fourth Embodiment

This embodiment is similar to the first, second and third embodiment in which same or similar reference numerals refer to same or similar elements and explanation of those same or similar elements is not repeated.

Figure 9:
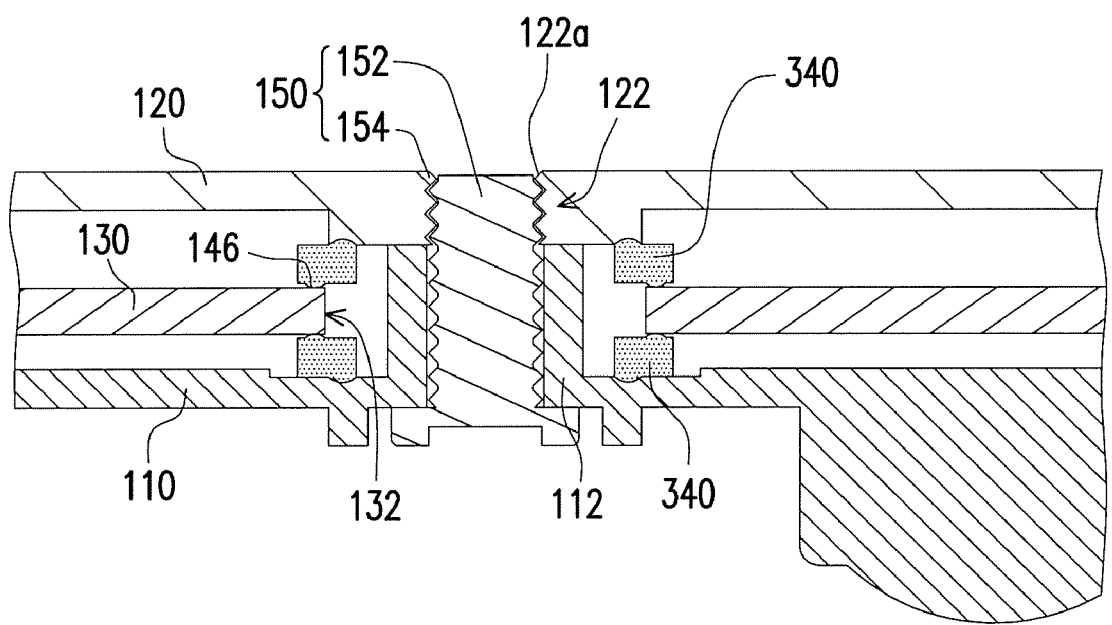
FIG. 9 illustrates a cross-sectional view of an electronic device according to a fourth embodiment of the present invention.

FIG. 9 illustrates a cross-sectional view of an electronic device according to a fourth embodiment of the present invention. Referring to FIG. 9, the embodiment different from the previous embodiments is that, in the electronic device 300 of the present embodiment, the non-metal conductive cushion 340 is a washer through which the fastening element 150 extends. Two washers are illustrated in FIG. 9, which are disposed between the circuit board 130 and the first housing portion 110, and between the circuit board 130 and the second housing portion 120, respectively, thereby providing buffering for the circuit board 130 and electrically coupling the circuit board 130 to at least one of the first housing portion 110 and the second housing portion 120 for grounding the circuit board 130. Besides, the location and number of the washer may be determined based upon actual requirements.

It should be noted that while the non-metal conductive cushion is illustrated as contacting the housing for grounding the circuit board in the above-described embodiments, the non-metal conductive cushion may have an equal potential as the housing or ground the circuit board via another conductive element. In other words, the non-metal conductive element may contact the housing indirectly.

Furthermore, it should be noted that the present invention can be practiced by flexibly combining or replacing one or more aspects of or making other suitable modifications to the above embodiments without departing from the spirits of the present invention.

In summary, in the electronic device of the present invention, the non-metal conductive cushion provides buffering to buffer impact due to shock or collision to thereby protect the circuit board. Therefore, the present invention reduces the likelihood of deformation or displacement of the circuit board in the case of shock or being stroked, thereby maintaining the circuit board to be stably secured with the housing. In addition, due to the conductive characteristic of the non-metal conductive cushion, the circuit board can be grounded via the non-metal conductive cushion electrically coupling the circuit board to the first housing portion or to the second housing portion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device comprising:
   a housing;
   a circuit board disposed in the housing;
   a first non-metal conductive cushion disposed between the circuit board and the housing and having a plurality of protrusions in contact with at least one of the housing and the circuit board to squeeze the housing and the circuit board more tightly, wherein a potential of the first non-metal conductive cushion is equal to a potential of the housing and the equivalent grounding result of the circuit board to the housing being further increased; and
   a fastening element fastening the circuit board and the first non-metal conductive cushion to the housing.

2. The electronic device according to claim 1, wherein the first non-metal conductive cushion is a washer.

3. The electronic device according to claim 1, wherein the first non-metal conductive cushion comprises a sleeve portion and a first supporting portion substantially perpendicularly connected to the sleeve portion, the circuit board has a mounting hole, the sleeve portion is disposed in the mounting hole, and the first supporting portion is disposed between a first surface of the circuit board and the housing.

4. The electronic device according to claim 3, wherein the first non-metal conductive cushion further comprises a second supporting portion substantially perpendicularly connected to the sleeve portion and disposed between a second surface of the circuit board opposite to the first surface and the housing.

5. The electronic device according to claim 1, further comprising a second non-metal conductive cushion, wherein the second non-metal conductive cushion and the first non-metal conductive cushion are located at opposite sides of the circuit board, respectively.

6. The electronic device according to claim 1, wherein the housing comprises a first housing portion and a second housing portion, the circuit board is disposed between the first housing portion and the second housing portion, and the fastening element passes through the circuit board and the first non-metal conductive cushion and is fastened to at least one of the first housing portion and the second housing portion.

7. The electronic device according to claim 6, wherein the first housing portion includes a first mounting portion and the second housing portion includes a second mounting portion.

8. The electronic device according to claim 7, wherein the first mounting portion is a hollow post, the second mounting portion defines an opening, and the fastening element passes through the first mounting portion and the second mounting portion to fasten the first housing portion and the second housing portion together.

9. The electronic device according to claim 7, wherein the first housing portion further includes a body and a protruding portion, the protruding portion protrudes from a surface of the body that faces toward the circuit board, and the protruding portion is connected between the body and the first mounting portion.

10. The electronic device according to claim 7, wherein the first mounting portion or the second mounting portion includes an internal thread and the fastening element is a screw.

11. The electronic device according to claim 7, wherein the fastening element includes a screw and a nut, the nut fits in the second mounting portion of the second housing portion, and the screw passes through the first mounting portion and is threaded into the nut.

12. The electronic device of claim 1, wherein the material of the first non-metal conductive cushion is conductive rubber.

* * * * *